Sept. 7, 1954    H. S. PIKE    2,688,191
COUNTER MECHANISM
Filed Jan. 12, 1952    2 Sheets-Sheet 1

INVENTOR
H. S. PIKE
BY
ATTORNEY

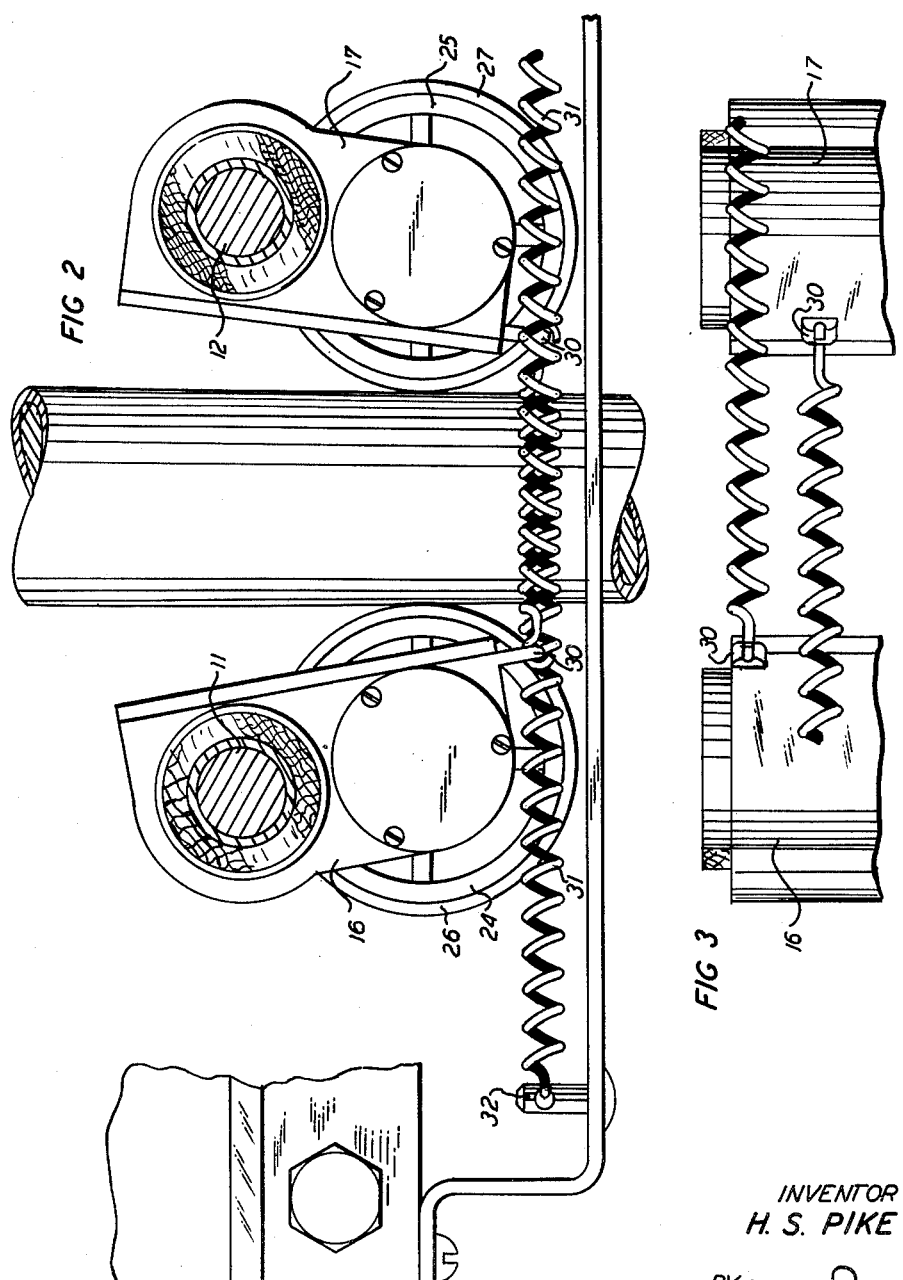

Patented Sept. 7, 1954

2,688,191

UNITED STATES PATENT OFFICE 2,688,191

COUNTER MECHANISM

Harold S. Pike, Fanwood, N. J., assignor to Western Electric Company, Incorporated, New York, N. Y., a corporation of New York Application January 12, 1952, Serial No. 266,213

2 Claims. (Cl. 33—129)

1

This invention relates to apparatus for measuring various sizes of cables or the like and is particularly adapted for re-reeling mechanisms wherein measured lengths of cables are to be removed from supply reels.

To supply the needs in the maintenance of telephone communications, distributing houses keep reels of various sizes of cable in stock. When orders are received for specified lengths of cables of certain sizes, it is necessary that the cables of the specified sizes be withdrawn from their supply reels and measured accurately and distributed on takeup reels.

During the distribution of a cable on a takeup reel the path of the cable is changing constantly and regardless of the structure of the distributing unit, it will bend the cable in one direction and then in another during its reciprocal movements to force the cable to form closely positioned convolutions in successive layers on the reel. When lengths of cable are to be measured the measuring unit travels with the distributor. However, unless the measuring unit is equipped with means to compensate for the bends in the cable it will not measure the cable accurately. For example, if the measuring unit includes a single roller driven through contact with the longitudinally advancing cable to actuate a counter, there will be a continuous inaccurate measurement of the cable due to the single roller riding alternately on the outside and inside of curved portions of the cable caused by the distributor. While the roller rides on the outside of the curved portions the measurement recorded by the counter is over or greater than the actual length of the cable and while the single roller rides on the inside of the curved portions the measurement recorded is under or less than the actual length of the cable. Although the over-measurements will be reduced by the under-measurements they will not result in the exact measurement of the cable due to the greater lengths of the cable in each layer of convolutions on the reel and the end of the measurement occurring during the completion of only a portion of a layer or an uneven number of layers.

An object of the invention is an apparatus which is readily adaptable to measure accurately lengths of various sizes of cables or the like.

With this and other objects in view, the invention comprises an apparatus for measuring various sizes of cable or the like in combination with a counter unit having a shaft rotatable to actuate registering mechanism of the counter unit, the apparatus including rollers movable into engagement with spaced portions of a cable, associated with separate means driven by the rollers and connected to the shaft of the counter through a differential mechanism whereby half the sum of the distances of travel of the rollers will be directed to the counter unit to cause it to register the length of the cable.

In the present embodiment of the invention, the rollers are carried by arms urged toward the path of the cable so that the rollers will engage opposing portions of the cable regardless of its sizes and be caused to follow the contours of these portions of the cable. The arms are supported by shafts which are connected to the input sides of a differential so that the output of the differential connected to the counter unit will register, more accurately, the length of the cable.

Other objects and advantages will be apparent from the following detailed description when considered in conjunction with the accompanying drawings wherein:

Fig. 2 is a sectional view taken along the line 2—2 of Fig. 1 and

Fig. 3 is a rear elevational view of a portion of that shown in Fig. 2.

Figure 1:
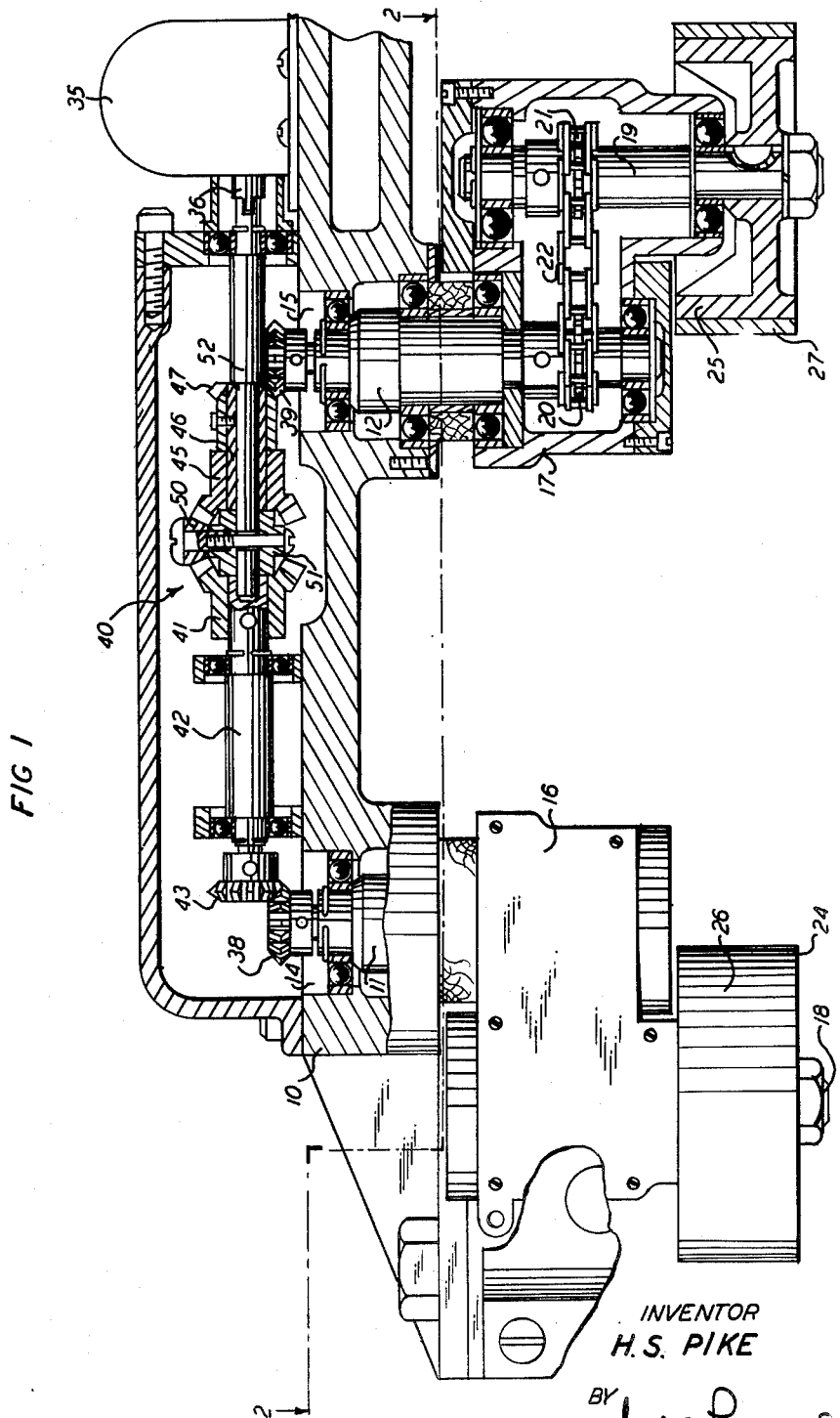
Fig. 1 is a vertical sectional view of the apparatus, portions hereof being shown in elevation.

Referring now to the drawings, attention is first directed to Fig. 1 which shows a frame 10 supported in any suitable manner. In the present embodiment of the invention, the frame 10 is a part of a distributing mechanism of an apparatus shown in my co-pending application, Serial Number 266,215, filed January 12, 1952. Parallel shafts 11 and 12 are rotatably supported in suitable bearings disposed in spaced apertures 14 and 15 of the support 10. Hollow arms 16 and 17 are mounted for rocking movement on the lower portions of the shafts 11 and 12 and are formed to receive bearings for shafts 18 and 19. The shafts 12 and 19 have sprockets 20 and 21 mounted thereon to receive a chain 22 which operatively connects the shafts. The shafts 11 and 18 are connected in the same manner through sprockets and a chain (not shown). Rollers 24 and 25 are mounted on the lower ends of the shafts 18 and 19, the rollers in the present embodiment of the invention being provided with tires 26 and 27 formed of suitable material to create frictional contact with their respective portions of each cable being measured. The arms 16 and 17 have apertured projections 30 to receive the inner ends of springs 31, the outer ends of the springs being connected to fixed positioned pins 32, only one of which is shown in the drawings.

A counter unit 35 of a commercially known type is mounted on the support and has a shaft 36 which, when rotated, will drive the counting mechanism of the unit. The diameters of the rollers and the mechanisms leading from the rollers to the counter are such that the counter will record for visual observance the number of feet of cable which has moved between the rollers.

Bevelled gears 38 and 39 mounted on their shafts 11 and 12 constitute the ends of the driven means for their respective rollers 24 and 25. A differential unit indicated at 40 is interposed between the driven means or the bevelled gears 38 and 39. One input side of the differential 40, represented by a bevelled gear 41 fixed to a shaft 42, is connected to the driven means of the roller 24 by a bevelled gear 43 mounted on the shaft 42 and interengaging the bevelled gear 38. The other input side of the differential, represented by a bevelled gear 45 mounted on a hollow shaft 46, is connected to the driven means of the roller 25 by a bevelled gear 47 which interengages the bevelled gear 39 and is mounted on the hollow shaft 46. The connecting pinion 50 and its cradle 51, interposed between the gears 41 and 45 of the differential, drive a shaft 52 which is connected to the shaft 36 of the counter 35.

Considering now the operation of the apparatus, it will be apparent that through the rocking motions of the arms 16 and 17 and the forces of the springs 31 to normally urge them toward the path along which all cables travel regardless of their size, the rollers 24 and 25 will engage opposing surfaces of each cable as shown in Fig. 3. The construction of each driven means of the rollers 24 and 25 permit not only movement of the rollers toward each other varied distances so that they will engage opposing surfaces of cables to be measured, but will permit the rollers to move independently of each other under the control of the particular contours of their portions of the cables.

Each roller will drive its immediate shaft 18—19 and through the sprocket and chain connection drive its auxiliary shaft 11—12 to drive its input side of the differential. If the cable being measured is uniform throughout containing no low or high portions, the outlet ends of the driven means namely the bevelled gears 38 and 39 will travel at the same speed imparting like motions in the same direction to the input sides of the differential causing the pinion 50 to move in a circular path as if fixed to the pivotal gears 41 and 45 to drive the shaft 52 at the same speed. However, if an irregularity should occur in one portion of the cable causing, for example, the roller 25 to travel at a faster rate of speed resulting from a high or low portion during the travel of the cable between the rollers at a constant rate of speed, the bevelled gear 39 during this interval, will travel faster than the pivotal gear 38 causing a difference in the speed of travel of the input portions 41 and 45 of the differential. As a result, the differential will transfer half the sum of the speeds of the input sides of the differential to the counter through the shafts 52 and 36 so that the amount recorded by the counter will be more accurate than if it depended solely upon the action of the roller 25.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for measuring various sizes of cables or the like in combination with a counter unit having a shaft rotatable to actuate registering mechanism of the counter unit, the apparatus comprising a support for the counter disposed at a given position transversely of a path for the cables, a vertically extending supporting shaft positioned at each side of the path and rotatably carried by the support, a differential unit mounted on the support with power inputs connected respectively to the supporting shafts and an output connected to the counter shaft, arms rockably mounted on the supporting shafts, vertically positioned roller shafts rotatably supported by the arms at positions spaced from and parallel with their respective supporting shafts, means operatively connecting the roller shafts with their respective supporting shafts, rollers mounted on the roller shafts to engage opposing sides of a cable to be measured and be driven thereby, whereby half the sum of the distances of travel of the rollers on their respective portions of the cable will be directed by the differential unit to the measuring unit, and separate springs for the arms to apply like pressures of the rollers to the cable.

2. An apparatus for measuring various sizes of cables or the like in combination with a counter unit having a shaft rotatable to actuate registering mechanism of the counter unit, the apparatus comprising a support for the counter disposed at a given position transversely of a path for the cables, a vertically extending supporting shaft positioned at each side of the path and rotatably carried by the support, a differential unit mounted on the support with power inputs connected respectively to the supporting shafts and an output connected to the counter shaft, arms rockably mounted on the supporting shafts, vertically positioned roller shafts rotatably supported by the arms at positions spaced from and parallel with their respective supporting shafts, means operatively connecting the roller shafts with their respective supporting shafts, rollers mounted on the roller shafts to engage opposing sides of a cable to be measured and be driven thereby, whereby half the sum of the distances of travel of the rollers on their respective portions of the cable will be directed by the differential unit to the measuring unit, and separate means to rock the arms about their supporting shafts to force the rollers under like pressures to engage all parts of their respective cable portions regardless of variations in sizes of cables being measured or the deviation of their portions from the said path.

References Cited in the file of this patent

UNITED STATES PATENTS

| Number | Name | Date |
|---|---|---|
| 1,739,247 | Marchev | Dec. 10, 1929 |
| 2,085,264 | Lyon | June 29, 1937 |
| 2,115,822 | Menschner | May 3, 1938 |
| 2,591,615 | Saff et al. | Apr. 1, 1952 |